United States Patent
Saint-Ramon et al.

(10) Patent No.: US 6,732,486 B2
(45) Date of Patent: May 11, 2004

(54) MACHINE FOR CONVEYING AND MOVING INTO POSITION TUBES, IN PARTICULAR STRAWS

(75) Inventors: Jean-Gérard Saint-Ramon, L'aigle (FR); Christian Beau, Voisins le Bretonneux (FR); Jean-Yves Chenu, Saint-Sulpice sur Risle (FR); Claude Toujas, Saint-Ouen sur Iton (FR)

(73) Assignee: IMV Technologies, L'Aigle (FR)

( * ) Notice: Subject to any disclaimer, the term of this patent is extended or adjusted under 35 U.S.C. 154(b) by 178 days.

(21) Appl. No.: 09/769,690

(22) Filed: Jan. 25, 2001

(65) Prior Publication Data

US 2001/0015313 A1 Aug. 23, 2001

(30) Foreign Application Priority Data

Jan. 31, 2000 (FR) ............................................. 00 01204

(51) Int. Cl.$^7$ ................................................. B65B 3/00
(52) U.S. Cl. ........................ 53/131.4; 53/236; 53/246; 53/243; 53/235; 53/250; 53/259; 53/282; 53/251; 53/252; 53/566
(58) Field of Search ............................... 53/131.4, 282, 53/235, 236, 246, 248, 259, 80, 131.3, 131.2, 131.1, 250, 249, 264, 284.6, 566, 254, 252, 251; 209/685, 665, 684; 198/803.8, 397, 443

(56) References Cited

U.S. PATENT DOCUMENTS

| 3,315,784 A | | 4/1967 | Poll |
| 3,458,086 A | | 7/1969 | Strohmeier |
| 3,599,389 A | * | 8/1971 | Hartman ........................ 53/51 |
| 3,788,035 A | * | 1/1974 | Geisel .......................... 53/282 |
| 3,841,472 A | * | 10/1974 | Fuller et al. ................. 206/713 |
| 3,917,055 A | | 11/1975 | VandenBerg et al. |
| 4,006,275 A | * | 2/1977 | Monia ...................... 40/299.01 |
| 4,063,633 A | * | 12/1977 | Hall ............................ 198/455 |
| 4,118,914 A | * | 10/1978 | Shields ........................ 53/282 |
| 4,327,825 A | * | 5/1982 | Ackley, Sr. et al. ......... 198/380 |
| 4,418,815 A | | 12/1983 | Anderson et al. |
| 4,446,960 A | * | 5/1984 | Zauner et al. ............... 198/408 |
| 4,519,867 A | * | 5/1985 | Rubey ......................... 156/351 |
| 4,741,432 A | * | 5/1988 | Dekko ...................... 198/803.8 |
| 5,067,532 A | * | 11/1991 | Lang et al. .................. 141/329 |

(List continued on next page.)

FOREIGN PATENT DOCUMENTS

| FR | 2 700 313 | 1/1993 |
| FR | 2762210 | 10/1998 |
| FR | 2771284 | 5/1999 |
| FR | 2771285 | 5/1999 |
| SU | 151083 | 9/1962 |
| SU | 345072 | 7/1972 |
| SU | 627744 | 9/1978 |
| SU | 709469 | 1/1980 |

OTHER PUBLICATIONS

Patent Abstracts of Japan, Publication No. 60248507, Publication date Sep. 12, 1985.

Primary Examiner—Rinaldi I. Rada
Assistant Examiner—Gloria R. Weeks
(74) Attorney, Agent, or Firm—Morgan&Finnegan, L.L.P.

(57) ABSTRACT

A machine for conveying and moving into position tubes (124), the machine including a chute (42) with a vertical feed station for said tubes, conveyor belts (12) and a motor (31) for moving said conveyor belts, characterized in that said conveyor belts have two areas, namely an area (121) for loading said tubes and an area (122) for positioning said tubes, and a longitudinal recess co-operating with pressing means (44) for inserting said tubes into said positioning area during longitudinal movement of said belts under said chute (42).

13 Claims, 4 Drawing Sheets

U.S. PATENT DOCUMENTS

| | | | | |
|---|---|---|---|---|
| 5,160,940 A | * | 11/1992 | Cassou et al. | 347/4 |
| 5,209,040 A | * | 5/1993 | Yamamoto et al. | 53/137.2 |
| 5,501,064 A | * | 3/1996 | Ingram et al. | 53/473 |
| 5,542,523 A | * | 8/1996 | Abbate et al. | 198/384 |
| 5,752,312 A | * | 5/1998 | Harman et al. | 29/726.5 |
| 5,884,457 A | * | 3/1999 | Ortiz et al. | 53/468 |
| 5,896,728 A | * | 4/1999 | Domino et al. | 53/458 |
| 6,006,492 A | * | 12/1999 | Draghetti | 53/148 |
| 6,024,205 A | * | 2/2000 | Adalbert | 198/463.6 |
| 6,047,525 A | * | 4/2000 | Kieras et al. | 53/411 |
| 6,082,077 A | * | 7/2000 | Christ | 53/250 |
| 6,212,860 B1 | * | 4/2001 | Preisner et al. | 53/547 |
| 6,311,831 B1 | * | 11/2001 | van der Griendt et al. | 198/487.1 |
| 6,389,682 B1 | * | 5/2002 | Tokunaga et al. | 29/714 |

* cited by examiner

MACHINE FOR CONVEYING AND MOVING INTO POSITION TUBES, IN PARTICULAR STRAWS

CROSS-REFERENCE TO RELATED APPLICATIONS

This Application claims the priority under 35 U.S.C. § 119 of French Patent Application No. 001204 filed on Jan. 31, 2000.

BACKGROUND OF THE INVENTION

1. Field of the Invention

The present invention relates to a machine for conveying and moving into position tubes, in particular straws.

The invention also relates to a machine for distributing, filling, sealing and printing tubes such as straws.

2. Description of Related Art

To make the following description easier to understand, the invention will be described with reference to straws like those intended for artificial insemination of bovine species, but it must be understood that its scope is not under any circumstances to be understood as restricted to a machine for straws.

A straw is a narrow circular section tube for the conservation of small quantities of substances, especially biological substances, in particular biological liquids.

A straw with a tripartite plug consisting of two pads of a fibrous substance enclosing a powder capable of being transformed in contact with a liquid into an impermeable gel or paste adhering to the wall of the tube, creating a tight stopper, known as a "French straw", was disclosed for the first time in the applicant's French patent N° 995 878.

The applicant has also developed other straws with a non-absorbent plug.

The applicant's FR-A-2 762 210 describes a straw consisting of a segment of tube fitted inside one end with closure means consisting of a hydrophobic microporous one-piece plug. The applicant's FR-A-2 771 284 and FR-A-2 771 285 respectively describe a straw with an adapter insert and a straw with a bipartite plug.

A straw is generally filled by aspiration through the plug using a vacuum pump. The straw is closed off by sealing the end opposite the plug.

The straws must be distributed and transferred before being filled, sealed and printed.

There are machines for automating the above operations.

One type of machine is designed around a rotary barrel and a fixed hopper with a straw transfer ramp. The barrel is reciprocated to enable straws to be placed in the peripheral grooves.

The drawback of the above machine is a relatively low throughput and the straws are not always distributed correctly therein.

Another type of machine is designed around a rotary barrel and an oscillatory hopper. The hopper oscillates when the machine is stopped to place straws in the peripheral grooves of the barrel. The drawback of this machine is that it is complex and the straws are not always distributed correctly in it.

Machines which use a pneumatic drive system have the drawback of requiring a compressor in the place of use. Also, the use of compressed air in places where dust is controlled is inconvenient.

The applicant has designed a machine, which is still in use, based on a fixed hopper with an untangling roller and a mechanical indexing system for loading the straws three by three into the grooves of conveyor belts which convey them to filling and welding stations.

The machine is very reliable and has the advantage of offering up the straws to the filling and welding stations in a horizontal plane. However, it has the drawback of being complex and noisy.

Furthermore, the aforementioned machines are not very ergonomic for the user.

BRIEF SUMMARY OF THE INVENTION

An object of the present invention is to provide a machine that does not have the drawbacks of the prior art machines used until now, and in particular which is simple and quiet.

Another object of the invention is to provide a machine that is ergonomic for the user.

The above objects, along with others that will become apparent on reading the following description, are satisfied by the machine in accordance with the invention which is adapted to enable automation of distribution and transfer operations, i.e. of conveying and moving into position tubes, especially straws.

The present invention therefore provides a machine for conveying and moving into position tubes, the machine including a chute with a vertical feed station for said tubes, conveyor belts and a motor for moving said conveyor belts, characterized in that said conveyor belts have two areas, namely an area for loading said tubes and an area for positioning said tubes, and a longitudinal recess co-operating with pressing means for inserting said tubes into said positioning area during longitudinal movement of said belts under said chute. The pressing means consist of an inclined pressing member, for example.

In one advantageous embodiment of the invention the conveyor belts have a shape enabling association of a loading vee, a circular section groove and a longitudinal recess.

The machine according to the invention advantageously further includes a vacuum pump for filling the tubes and a welding station for welding the tubes. Integrating the filling vacuum pump into the machine reduces noise and also simplifies the electrical wiring and pneumatic connections.

The machine can also include an indexing member between the motor and the conveyor belts to assure the stationary and moving phases of said conveyor belts, for example a cam-type indexing member.

One particularly beneficial embodiment of the machine according to the invention further includes a printing distributor, for example an inkjet printing head, for printing the tubes.

The invention will now be described in more detail, but in a non-limiting fashion, with reference to the accompanying drawings, in which:

DETAILED DESCRIPTION

Figure 1:
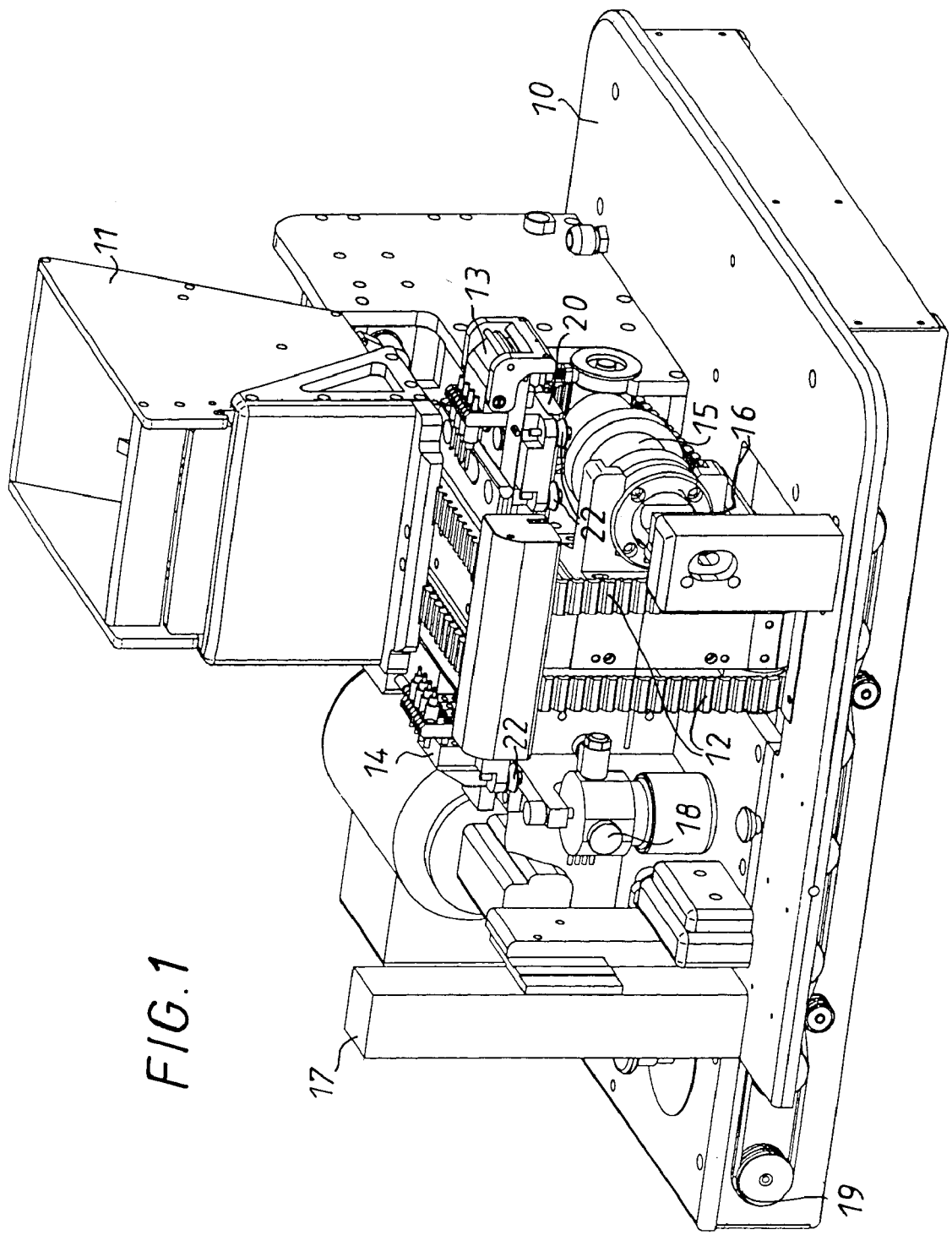
FIG. 1 is a general perspective view of the machine according to the invention.
Figure 2:
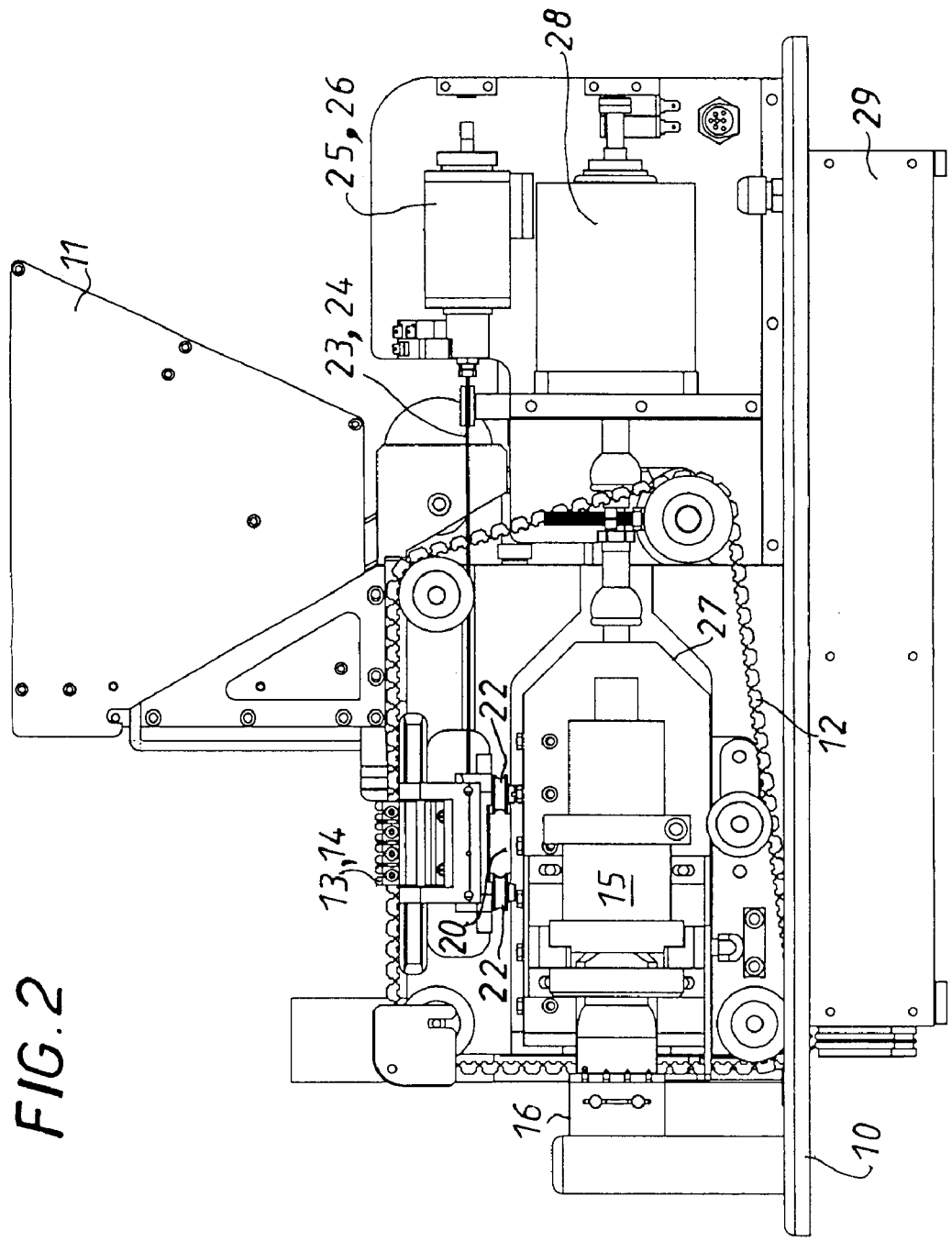
FIG. 2 is a side view of FIG. 1.
Figure 4:
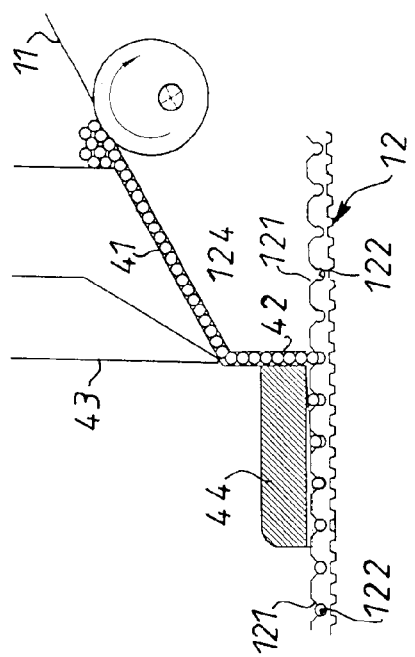
FIG. 4 is a diagrammatic sectional view of a detail of the machine.

On the frame 1 can be seen the hopper 11 for distributing straws ready to be filled and the conveyor belts 12 for feeding (conveying) and positioning (distributing) straws four by four.

In the embodiment shown, the machine according to the invention includes a welding station with a sonotrode 15, an anvil 16, an inkjet printing head 17, and a control 18 for the vacuum pump. The distributor 19 transfers filled and welded straws under the inkjet printing head.

The needle-support carriages 13 and 14 are mounted on a rail 20 with guide rollers 22.

Longitudinal displacement is obtained by means of cables 23 and 24 and electromagnets 25 and 26. Simultaneous movements of the carriages are obtained by information originating from an automaton of the control unit. It should be noted that, in the same configuration, a stepper motor wired as a synchronous motor can be used instead of an electromagnet.

The sonotrode-support 27 is a guide carriage controlled by an electromagnet 28.

It should be noted that, in the same configuration, a linear actuator based on a stepper motor with antirotation exit screw can be used instead of an electromagnet.

The lower portion 29 of the base 10 incorporates the electrical wiring, amplifiers of detector cells, and the drive motor of the distributor for transferring the straws under the inkjet head.

All these components are naturally protected from splashing with liquid.

Figure 3:
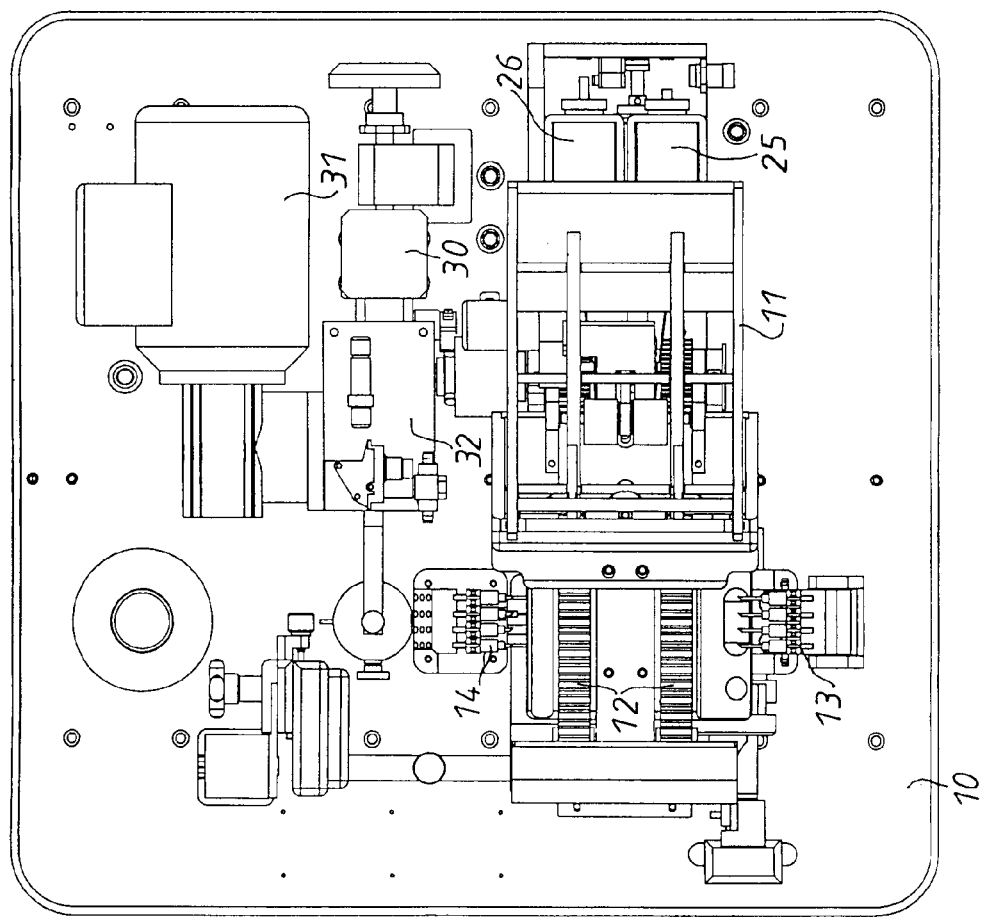
FIG. 3 is a plan view of FIG. 1.

FIG. 3 shows the filling vacuum pump 30, the motor 31 and the integral indexing member 32 for driving the conveyor belts 12.

The straw distributor hopper 11 is fixed. It is provided with an inclined ramp 41 for transferring straws and a vertical chute 42. Movement from the ramp to the chute is enabled by a paddle 43. The paddle is used to define a number of straws which is a multiple of four on starting and stopping the cycle, the machine distributing straws four by four.

In line with the vertical chute there are two polyurethane conveyor belts 12 which are reinforced with metal cables and insensitive to temperature variations. The conveyor belts separate the straws and distribute them into four consecutive grooves.

The conveyor belts move longitudinally at constant speed.

In accordance with the invention, the conveyor belts 12 comprise two areas:

an area 121 for loading straws 124, and an area 122 for positioning straws 124.

The conveyor belts 12 have a longitudinal recess 123 co-operating with pressing means 44 for inserting the straws 124 into the positioning area 122 during longitudinal movement of the belts under the vertical shoot 42.

As the conveyor belts 12 move an inclined pressing member 44 fixed to the hopper inserts the straws 124 into a loading area 121 towards a positioning area 122.

The operation of the machine shown is based on a discontinuous cycle:

straw transfer time: conveyor belts moving in translation, filling and welding time: conveyor belts stationary.

Filling and welding are carried out simultaneously.

The continuous movement of the conveyor belts is obtained from a motor which runs continuously when the machine is operating. The motor drives a cam-type integral indexing member 32 whose profile conforms to the above cycle. The advantage of an indexing member of this kind is that it avoids the need for any mechanical or electronic positioning system. The device is also free of play, and therefore free of wear and silent. Such indexing members can be obtained from SOPAP or FERGUSON, for example.

Figure 5:
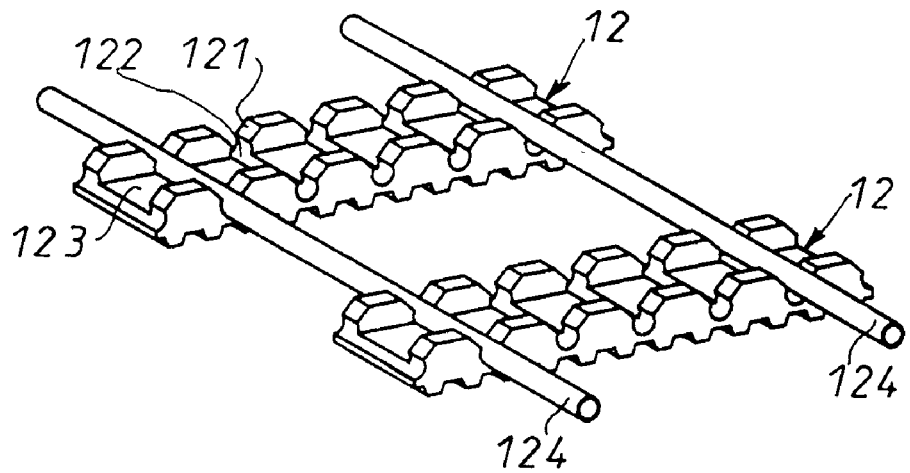
FIG. 5 is a perspective view of conveyor belts of the machine according to the invention.
Figure 6:
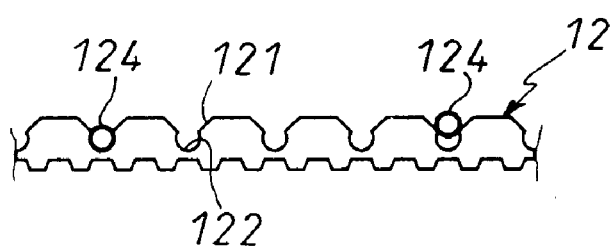
FIG. 6 is a side view of FIG. 5 showing a straw that has been fed and a straw that has been positioned.

FIGS. 5 and 6 show a straw 124 being filled (fed straw) on the right and being positioned (positioned straw) on the left.

Figure 7:
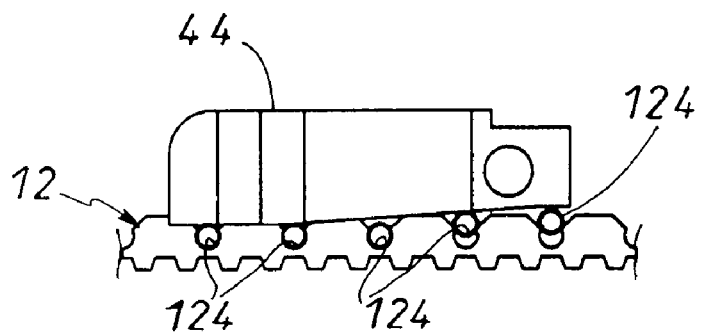
FIG. 7 is a diagrammatic side view of a detail of the machine.

FIG. 7 shows the action of the inclined pressing member 44 on a conveyor belt 12 to position the filled straws.

The skilled person will understand that although the invention has been described and shown by particular embodiments, numerous variants can be envisaged that remain within the scope of the invention as defined by the appended claims.

What is claimed is:

1. In a machine for conveying and moving into position tubes, the machine including a chute with a vertical feed station for said tubes, conveyor belts and a motor for moving said conveyor belts, the improvement which comprises said conveyor belts each having a plurality of receptacles, each receptacle having an area for loading said tubes and an area for positioning said tubes, each conveyor belt further having a longitudinal recess cooperating with pressing means for driving said tubes from said loading area to said positioning area and inserting said tubes into said positioning area during longitudinal movement of said belts after said chute placing said tubes onto said loading area of said receptacles.

2. A machine according to claim 1, wherein the conveyor belts have a shape enabling association of a loading vee, a circular section groove and a longitudinal recess.

3. A machine according to claim 2, wherein the machine further includes a vacuum pump for filling the tubes and a welding station for welding the tubes.

4. A machine according to claim 2, wherein the machine includes an indexing member between the motor and the conveyor belts assuring the stationary phases and moving phases of said conveyor belts.

5. A machine according to claim 2, wherein the machine further includes a printing distributor for printing the tubes.

6. A machine according to claim 1, wherein the machine further includes a vacuum pump for filling the tubes and a welding station for welding the tubes.

7. A machine according to claim 6, wherein the machine includes an indexing member between the motor and the conveyor belts assuring the stationary phases and moving phases of said conveyor belts.

8. A machine according to claim 6, wherein the machine further includes a printing distributor for printing the tubes.

9. A machine according to claim 1, wherein the machine includes an indexing member between the motor and the conveyor belts assuring the stationary phases and moving phases of said conveyor belts.

10. A machine according to claim 9, wherein the indexing member comprises a cam.

11. A machine according to claim 10, wherein the machine further includes a printing distributor for printing the tubes.

12. A machine according to claim 9, wherein the machine further includes a printing distributor for printing the tubes.

13. A machine according to claim 1 wherein the machine further includes a printing distributor for printing the tubes.

* * * * *